US012139027B2

(12) United States Patent
Pettey et al.

(10) Patent No.: US 12,139,027 B2
(45) Date of Patent: Nov. 12, 2024

(54) SELF-HEALING CONTAINMENT GELS FOR AIRCRAFT FUEL CELLS

(71) Applicant: Response Technologies, LLC, Coventry, RI (US)

(72) Inventors: David Allen Pettey, Westport, MA (US); Edmund F. Bard, Cumberland, RI (US); Lao Vang, Providence, RI (US)

(73) Assignee: RESPONSE TECHNOLOGIES, LLC, Coventry, RI (US)

( * ) Notice: Subject to any disclaimer, the term of this patent is extended or adjusted under 35 U.S.C. 154(b) by 505 days.

(21) Appl. No.: 17/228,993

(22) Filed: Apr. 13, 2021

(65) Prior Publication Data

US 2022/0024325 A1  Jan. 27, 2022

Related U.S. Application Data

(60) Provisional application No. 63/012,864, filed on Apr. 20, 2020.

(51) Int. Cl.
| | |
|---|---|
| *B60L 50/75* | (2019.01) |
| *B32B 1/00* | (2024.01) |
| *B32B 5/02* | (2006.01) |
| *B32B 7/12* | (2006.01) |
| *B32B 27/12* | (2006.01) |
| *B32B 27/40* | (2006.01) |
| *B64D 37/06* | (2006.01) |

(52) U.S. Cl.
CPC ............... *B60L 50/75* (2019.02); *B32B 1/00* (2013.01); *B32B 5/02* (2013.01); *B32B 7/12* (2013.01); *B32B 27/12* (2013.01); *B32B 27/40* (2013.01); *B64D 37/06* (2013.01); *B32B 2250/40* (2013.01); *B32B 2307/762* (2013.01); *B32B 2439/40* (2013.01); *B32B 2605/18* (2013.01)

(58) Field of Classification Search
CPC ........ B64D 37/06; B64D 37/32; B32B 27/12; B32B 27/40
See application file for complete search history.

(56) References Cited

U.S. PATENT DOCUMENTS

| | | | |
|---|---|---|---|
| 3,291,333 A | 12/1966 | House | |
| 3,664,904 A * | 5/1972 | Cook | B32B 27/308 220/560.04 |
| 3,847,722 A * | 11/1974 | Kistner | C08G 18/4833 428/128 |
| 3,969,563 A * | 7/1976 | Hollis, Sr. | E04C 2/34 428/920 |

(Continued)

OTHER PUBLICATIONS

International Search Report; PCT/US2021/027500; International Searching Authority; Jan. 28, 2022.

(Continued)

*Primary Examiner* — Philip J Bonzell
*Assistant Examiner* — Eric Acosta
(74) *Attorney, Agent, or Firm* — Lawrence Youst PLLC (57) ABSTRACT

A fuel cell containing fuel for an aircraft includes an innermost layer configured to contact the fuel, an outermost layer and a containment gel formed from isocyanate and polyol interposed between the innermost and outermost layers. The containment gel is configured to self-seal a ballistically formed hole therein, thereby reducing leakage of the fuel from the fuel cell.

20 Claims, 10 Drawing Sheets

(56) References Cited

U.S. PATENT DOCUMENTS

| | | | |
|---|---|---|---|
| 4,293,418 A | 10/1981 | Fujii et al. | |
| 6,586,064 B1 | 7/2003 | Abu-Isa | |
| 6,746,737 B2 | 6/2004 | Debalme et al. | |
| 6,860,218 B2 | 3/2005 | Eagles et al. | |
| 7,308,862 B2 | 12/2007 | Romanski et al. | |
| 7,569,275 B2 | 8/2009 | Fukushi et al. | |
| 8,129,024 B2 | 3/2012 | O'Brien et al. | |
| 8,916,249 B2 | 12/2014 | Liang et al. | |
| 9,056,447 B2 | 6/2015 | O'Brien et al. | |
| 9,221,020 B2 | 12/2015 | Cote et al. | |
| 9,321,539 B2 | 4/2016 | Briand | |
| 9,511,663 B2 | 12/2016 | McAlister | |
| 9,528,637 B2 | 12/2016 | Garver et al. | |
| 9,534,322 B2 | 1/2017 | Tomiyori et al. | |
| 9,573,460 B2 | 2/2017 | Bemis et al. | |
| 9,597,848 B1 | 3/2017 | Whipple et al. | |
| 9,597,859 B2 | 3/2017 | Childress et al. | |
| 9,617,665 B2 | 4/2017 | Valérie | |
| 9,772,052 B2 | 9/2017 | Garver et al. | |
| 9,802,476 B1* | 10/2017 | Whipple | B32B 27/42 |
| 9,809,109 B2 | 11/2017 | Kozar et al. | |
| 9,925,863 B2 | 3/2018 | Kozar et al. | |
| 9,950,613 B2 | 4/2018 | Kozar et al. | |
| 9,987,797 B2 | 6/2018 | Karsch | |
| 10,124,664 B2 | 11/2018 | Wilenski et al. | |
| 10,227,170 B2 | 3/2019 | Wilenski et al. | |
| 10,399,691 B2 | 9/2019 | Briand et al. | |
| 10,408,382 B2 | 9/2019 | Hutzen et al. | |
| 10,414,269 B2 | 9/2019 | Bemis et al. | |
| 10,457,138 B2 | 10/2019 | Wilenski et al. | |
| 10,471,676 B1 | 11/2019 | Whipple et al. | |
| 10,513,173 B1 | 12/2019 | Misciagna | |
| 10,549,470 B1 | 2/2020 | Whipple et al. | |
| 10,688,775 B2 | 6/2020 | Pettey et al. | |
| 2010/0151181 A1* | 6/2010 | Locke | C08G 18/10 524/590 |
| 2010/0325777 A1 | 12/2010 | Radhakrishnan et al. | |
| 2012/0305711 A1 | 12/2012 | Shannon | |
| 2016/0184874 A1* | 6/2016 | Schmid | D06N 3/0063 156/60 |
| 2017/0173916 A1* | 6/2017 | Widenbrant | B32B 27/12 |
| 2019/0300194 A1 | 10/2019 | Leachman et al. | |

OTHER PUBLICATIONS

Written Opinion; PCT/US2021/027500; International Searching Authority; Jan. 28, 2022.

\* cited by examiner

| | ISOCYANATE (MDI) | POLYOL (POLYETHER) | POLYGLYCOL (ADDITIVE) |
|---|---|---|---|
| | PERCENT BY WEIGHT | | |
| 1 | 19.29 | 80.71 | 0.00 |
| 2 | 19.15 | 73.50 | 7.35 |
| 3 | 19.04 | 67.47 | 13.49 |
| 4 | 18.94 | 62.35 | 18.71 |
| 5 | 18.86 | 57.96 | 23.18 |
| 6 | 18.79 | 54.14 | 27.07 |
| 7 | 18.72 | 50.80 | 30.48 |
| 8 | 18.67 | 47.84 | 33.49 |
| 9 | 18.61 | 45.21 | 36.18 |
| 10 | 18.57 | 42.85 | 38.58 |
| 11 | 18.53 | 40.73 | 40.74 |
| 12 | 18.49 | 38.82 | 42.69 |
| 13 | 18.46 | 37.06 | 44.48 |
| 14 | 18.43 | 35.46 | 46.11 |
| 15 | 18.40 | 34.00 | 47.60 |
| 16 | 18.37 | 32.65 | 48.98 |
| 17 | 18.35 | 31.40 | 50.25 |
| 18 | 18.33 | 30.25 | 51.42 |
| 19 | 18.31 | 29.17 | 52.52 |
| 20 | 18.29 | 28.17 | 53.54 |
| 21 | 18.27 | 27.24 | 54.49 |

SELF-HEALING CONTAINMENT GELS FOR AIRCRAFT FUEL CELLS

CROSS-REFERENCE TO RELATED APPLICATIONS

The present application claims the benefit of U.S. Provisional Application No. 63/012,864, filed Apr. 20, 2020, the entire contents of which is hereby incorporated by reference.

GOVERNMENT RIGHTS

This invention was made with government support under SBIR Phase II, Contract SP4701-19-C-0023 awarded by the Defense Logistics Agency. The government has certain rights in the invention.

TECHNICAL FIELD OF THE DISCLOSURE

The present disclosure relates, in general, to the containment of liquids such as fuel within an enclosure and, in particular, to self-healing containment gels disposed on or within one or more walls of an enclosure such as a fuel cell, the containment gels formulated to self-heal in response to being punctured by an object such as a projectile, thereby reducing the leakage of liquid from the enclosure.

BACKGROUND

In military and civilian applications, the leakage of liquid from a container after the container has been punctured can lead to financial loss, inconvenience or even loss of life. While the reach of this problem touches many fields of application, one area in which leak prevention is particularly critical is the storage of fuel in fuel cells including flexible fuel bladders and rigid fuel tanks. In military applications for both ground and airborne vehicles, fuel cells are at risk of being pierced ballistically by incoming fire such as bullet rounds and shrapnel. When such a puncture occurs, leaked fuel reduces the effective range of the vehicle and poses a fire hazard, among other detrimental effects.

Ballistically tolerant fuel cells have been in use since the World War II era. Previous fuel cells have incorporated various formulations of rubber to counteract the impact of a projectile against the fuel cell. When a projectile pierces the fuel cell wall, fuel escapes from the resulting hole in the fuel cell wall. The rubber swells when exposed to the fuel, thereby closing and sealing the hole in the fuel cell wall. The use of rubber as a protective layer against leakage has several drawbacks. For example, rubber-based sealing liners have a slow response time, which becomes progressively worse over time as the fuel cell ages. Another drawback is that if fuel leaks from an inside liner of the tank, which may occur in the case of a compromised liner, the rubber in the rubber sealing liner becomes prematurely activated. Once activated, the fuel cell must be decommissioned. Another drawback of rubber is that rubber requires exposure to fuel or other aromatic substances in order to be activated and swelled. Thus, rubber cannot be used in non-fuel applications such as water tanks or water hoses. In addition, rubber is a relatively heavy product and adds an undesirable weight penalty in weight sensitive applications such as aerospace applications. Accordingly, a need has arisen for liquid leakage barriers that have a reduced weight penalty and an enhanced operating lifespan while avoiding other drawbacks of existing self-healing liquid barriers including rubber-based sealing liners.

SUMMARY

In a first aspect, the present disclosure is directed to a fuel cell containing fuel for an aircraft including an innermost layer configured to contact the fuel, an outermost layer and a containment gel formed from isocyanate and polyol interposed between the innermost and outermost layers. The containment gel is configured to self-seal a ballistically formed hole therein, thereby reducing leakage of the fuel from the fuel cell.

In some embodiments, the isocyanate may be in a range between 18 percent and 20 percent by weight of a total containment gel formulation weight. In certain embodiments, the isocyanate may include methylene diphenyl diisocyanate. In some embodiments, the containment gel may include a plasticizer to affect the rheology of the containment gel. In certain embodiments, a liquidity of the containment gel may be proportional to an amount of the plasticizer in the containment gel. In such embodiments, the containment gel may include the plasticizer in a range between 20 percent and 50 percent by weight of a total containment gel formulation weight. In certain embodiments, the plasticizer may include a monomer.

In some embodiments, the containment gel may include a catalyst to accelerate crosslinking of the isocyanate and the polyol. In such embodiments, the catalyst may include at least one of an organotin catalyst or an amine catalyst. In certain embodiments, the polyol component of a pre-cure containment gel polymer mixture may include the catalyst in a range between 0.1 percent and 0.4 percent by weight. In some embodiments, the containment gel may include a tackifier to increase adhesive and cohesive properties of the containment gel, thereby facilitating adhesive reconnection between the edges of the hole. In certain embodiments, a pre-cure containment gel polymer mixture may include the tackifier in a range between 0.1 percent and 5 percent by weight. In some embodiments, the tackifier may include at least one of a hydrocarbon resin, a terpene or a gum rosin. In certain embodiments, the containment gel may include at least one of an antimicrobial agent or an antifouling agent. In some embodiments, the fuel cell may include one or more inner intermediate layers between the innermost layer and the containment gel and one or more outer intermediate layers between the outermost layer and the containment gel. In such embodiments, the inner and/or outer intermediate layers may include a textile layer.

In a second aspect, the present disclosure is directed to an aircraft including a fuselage, a propulsion system powered by fuel and one or more fuel cells configured to store the fuel. Each fuel cell includes an innermost layer configured to contact the fuel, an outermost layer and a containment gel formed from isocyanate and polyol interposed between the innermost and outermost layers. The containment gel is configured to self-seal a ballistically formed hole therein, thereby reducing leakage of the fuel from the fuel cell.

In some embodiments, the propulsion system may include a gearbox containing gears and a lubricant, the gearbox including a containment gel layer formed from isocyanate and polyol. In certain embodiments, the innermost and outermost layers of each fuel cell may form a plurality of sides, the containment gel interposed between the innermost and outermost layers in at least a portion of one or more of the sides. In some embodiments, the innermost and outermost layers of each fuel cell may form a plurality of sides, the containment gel interposed between the innermost and outermost layers in each of the sides. In certain embodiments, the innermost and outermost layers may include flexible layers such that each fuel cell is a flexible fuel bag. In some embodiments, the innermost and outermost layers may include rigid layers. In certain embodiments, the containment gel may be substantially nonreactive with the fuel.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
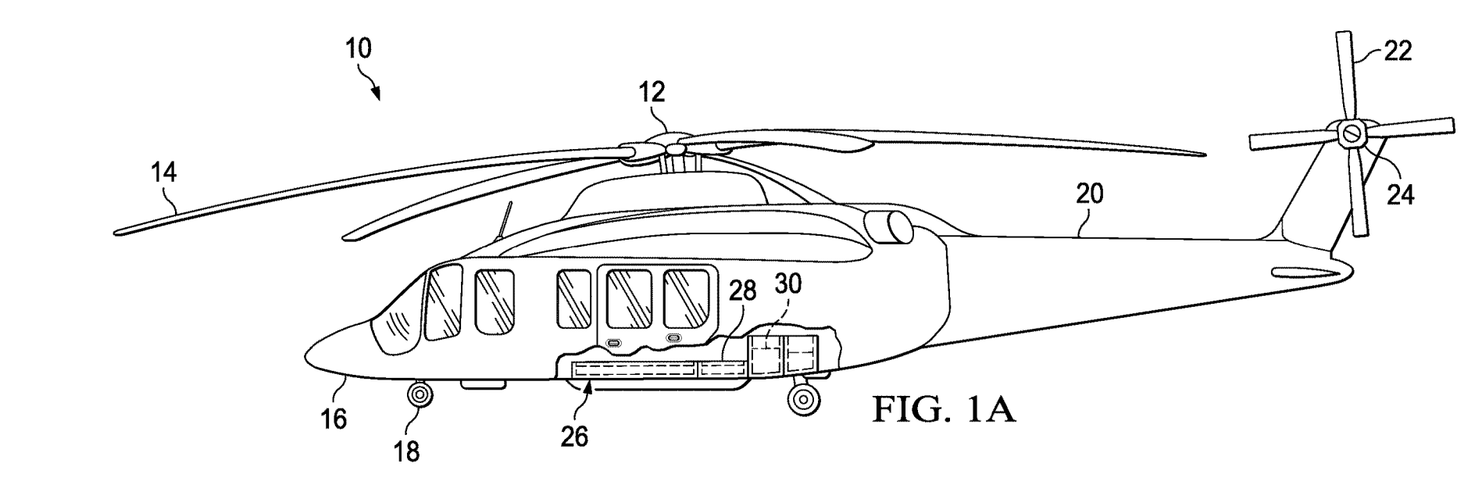
FIGS. 1A-1B are schematic illustrations of a rotorcraft utilizing a containment gel in accordance with embodiments of the present disclosure.
Figure 1B:
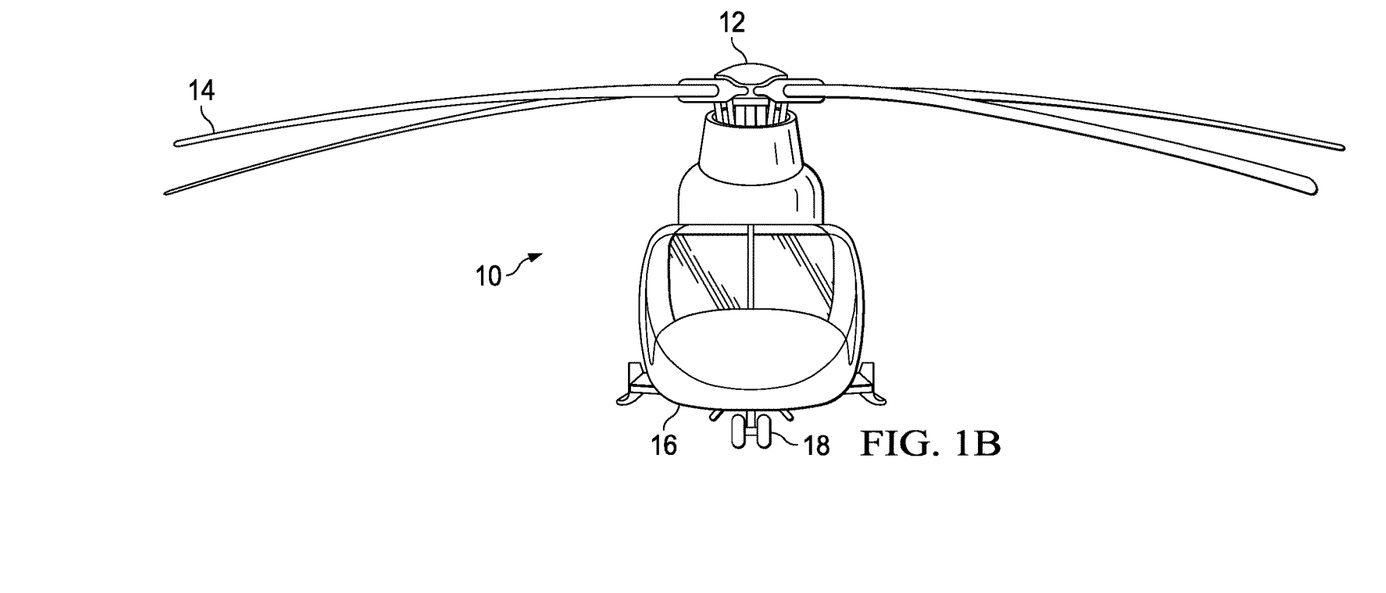

Referring to FIGS. 1A-1B the drawings, a rotorcraft is schematically illustrated and generally designated 10. Rotorcraft 10 is depicted as a helicopter having a rotor hub assembly 12, which includes a plurality of rotor blade assemblies 14. Rotor hub assembly 12 is rotatable relative to a fuselage 16 of rotorcraft 10. The pitch of rotor blade assemblies 14 can be collectively and/or cyclically manipulated to selectively control direction, thrust and lift of rotorcraft 10. A landing gear system 18 provides ground support for rotorcraft 10. A tailboom 20 extends from fuselage 16. A tail rotor 22 includes a tail rotor hub assembly 24 that is rotatably coupled to the aft portion of tailboom 20.

Rotorcraft 10 has a fuel system 26, including a fuel cell receiving assembly 28 located in a lower portion of fuselage 16. Fuel cell receiving assembly 28 is coupled to fuselage 16 and may be fully or partially integral with fuselage 16 or may be independent of but secured to fuselage 16. In other aircraft configurations, fuel cell receiving assembly 28 may be located elsewhere in rotorcraft 10. Fuel cell receiving assembly 28 contains one or more fuel cells 30 such as flexible fuel bags or rigid fuel tanks, each of which contain fuel. The fuel contained in fuel cells 30 is used as an energy source to power the various systems of rotorcraft 10 such as rotor hub assembly 12 and tail rotor hub assembly 24. Fuel cells 30 are at risk of being pierced ballistically by objects. For example, in military applications, fuel cells 30 are susceptible to being punctured by incoming enemy fire such as bullet rounds and shrapnel. When fuel cells 30 are punctured, leaked fuel reduces the effective range of rotorcraft 10 and poses a fire or explosion hazard.

Previous fuel cells have incorporated various formulations of rubber to counteract the impact of a projectile against the fuel cell. When a projectile pierces the fuel cell wall, fuel escapes from the resulting hole in the fuel cell wall. The rubber swells when exposed to the fuel, thereby closing and sealing the hole in the fuel cell wall. The use of rubber as a protective layer against leakage has several drawbacks. For example, rubber-based sealing liners have a slow response time, which becomes progressively worse as the fuel cell ages. Another drawback is that if fuel leaks from an inside liner of the tank, the rubber in the rubber sealing liner becomes prematurely activated. Once activated, the fuel cell must be decommissioned. Another drawback of rubber is that rubber requires exposure to fuel or other aromatic substances in order to be activated and swelled. Thus, rubber cannot be used in non-fuel applications such as water tanks or water hoses. In addition, rubber is a relatively heavy product and adds an undesirable weight penalty when used on aircraft.

To address these and other drawbacks of rubber-based sealing liners, the illustrative embodiments include a self-healing elastomeric containment gel layer used to coat or otherwise couple to all or a portion of a liquid enclosure. The containment gel self-heals ballistically formed holes therein, thereby reducing leakage of the liquid from the enclosure. In the illustrated embodiment, the containment gel is positioned on or within one or more walls of fuel cells 30. When a wall of one of fuel cells 30 is pierced by a projectile or other object, a hole is formed in the wall. The containment gel fills the hole by self-healing when the wall is punctured. When the wall is punctured, one or more layers of the containment gel quickly retracts back to its original form, position and/or location to seal the hole formed in fuel cells 30. The viscoelastic nature of the containment gel allows the containment gel to quickly snap back to its original set position to seal the breach. While snapping back into position, the tackiness of the containment gel allows the breached edges to reconnect.

Unlike rubber-based products, the containment gel of the illustrative embodiments does not require contact with fuel or other aromatics to be triggered or activated, leading to several benefits. For example, the containment gel may be used across a wider range of liquid containers. Indeed, the containment gel may be used to protect against the leakage of any non-solid substance including any gas or liquid. For example, the containment gel may be used in the walls of a water tank to prevent the leakage of water therefrom. The containment gel is also not prone to premature activation, which may occur in rubber-based products when fuel leaks through the innermost layer of fuel cells 30. The containment gel is also effective at lower weights than previous rubber counterparts, allowing the containment gel to be used in weight sensitive applications such as aerospace applications. The containment gel is also more compatible with additively manufactured liquid enclosures and tanks such as additively manufactured fuel tanks. Compared to rubber-based sealing liners, the containment gel has performance characteristics that do not degrade over the useful life of the enclosures, cells, bladders, containers or tanks they are used in conjunction therewith.

It should be appreciated that rotorcraft 10 is merely illustrative of a variety of aircraft that can implement the embodiments disclosed herein. Indeed, the containment gels of the illustrative embodiments may be implemented on any aircraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, jets, drones and the like. As such, those skilled in the art will recognize that the containment gels of the illustrative embodiments can be integrated into a variety of aircraft configurations. It should be appreciated that even though aircraft are well-suited to implement the embodiments of the present disclosure, non-aircraft vehicles including ground vehicles as well as devices such as water tanks, standalone fuel tanks, water hoses and non-enclosure panels can also implement the embodiments.

Figure 2A:
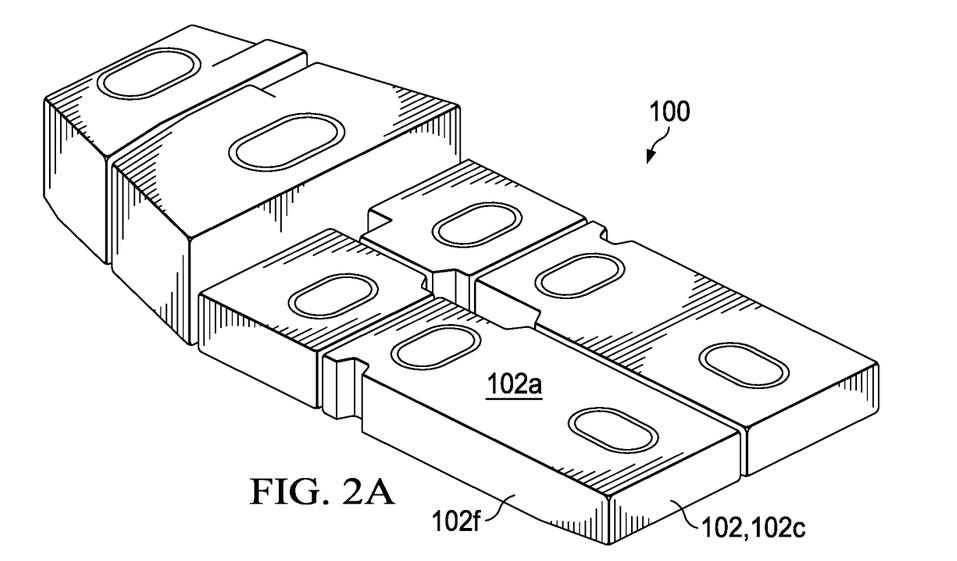
FIGS. 2A-2C are various views of fuel cells including a containment gel for use in an aircraft in accordance with embodiments of the present disclosure.
Figure 2B:
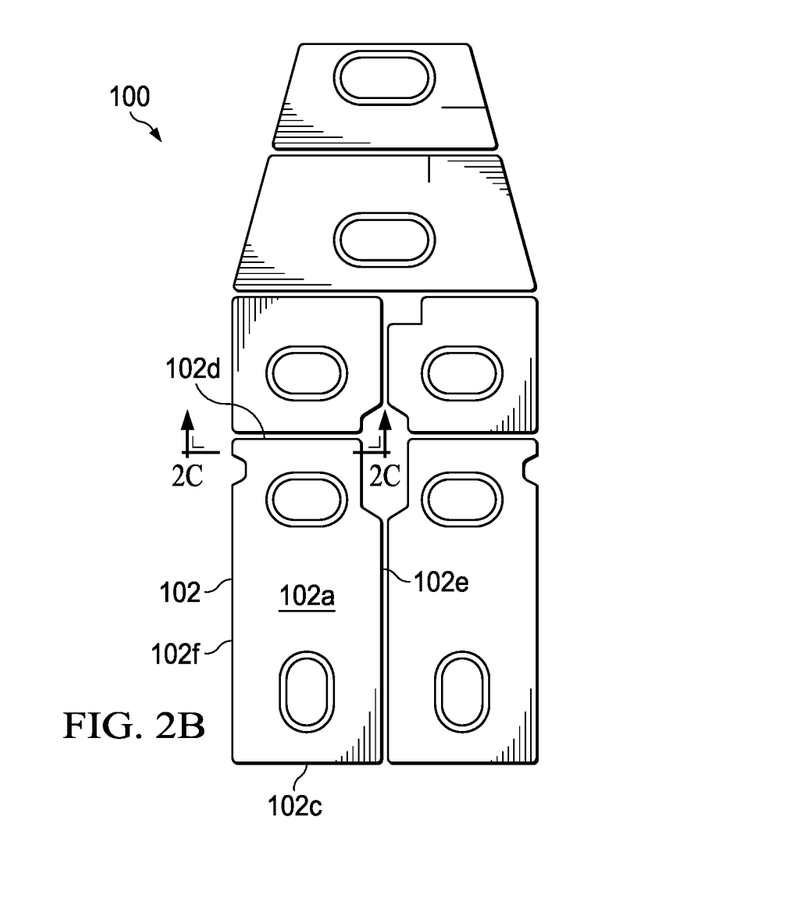
Figures 2C, 3:
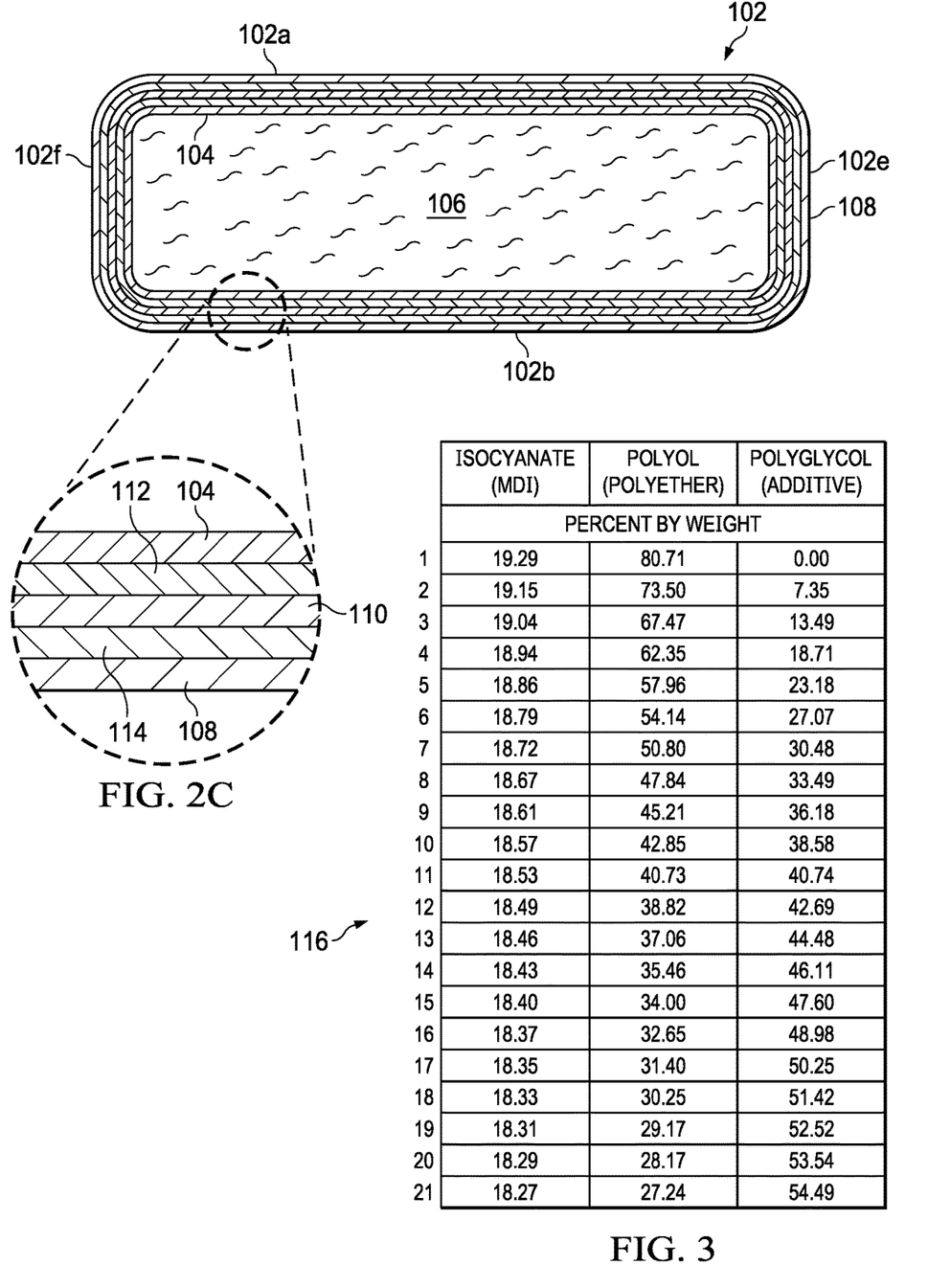
FIG. 3 is a chart illustrating various formulations of a containment gel in accordance with embodiments of the present disclosure.

Referring to FIGS. 2A-2C in the drawings, fuel cells for a rotorcraft such as rotorcraft 10 in FIGS. 1A-1B are schematically illustrated and generally designated 100. Fuel cells 100 may be fluidly coupled to one another to allow for the transfer of fuel or gas therebetween. Fuel cells 100 include fuel cell 102, for which a cross-sectional view is provided in FIG. 2C. Fuel cell 102 is substantially similar to the other fuel cells 100 therefore, for sake of efficiency, certain features will be disclosed only with regard to fuel cell 102. One having ordinary skill in the art, however, will fully appreciate an understanding of all fuel cells 100 based upon the disclosure herein of fuel cell 102. While FIG. 2C illustrates various layers of fuel cell 102, the layers shown in FIG. 2C are not necessarily illustrated to scale and thus the various layers of fuel cell 102 may have different relative thicknesses as well as uniform or nonuniform thicknesses depending on the embodiment. Fuel cell 102 forms a plurality of sides including a top side 102a, a bottom side 102b, a forward side 102c, an aft side 102d, a port side 102e and a starboard side 102f. It will be appreciated, however, that each fuel cell 100 may have any number of curved or straight sides each facing any desired direction.

Fuel cell 102 includes an innermost layer 104. Because innermost layer 104 contacts fuel 106, innermost layer 104 is fuel resistant or fuel tolerant. Innermost layer 104 also defines an internal fluid reservoir to contain fuel 106 of fuel cell 102. Innermost layer 104 may be made from various materials that are suitable for containing fuel 106. In some embodiments, innermost layer 104 may be made from one or more materials that are resistant to being pierced. For example, innermost layer 104 may be made from metallic or metallic alloy materials that are resistant to impact from projectiles such as military projectiles. Innermost layer 104 may also be made from a composite or carbon-based material. Non-limiting examples of other materials from which innermost layer 104 may be composed include polyvinylidene fluoride (PVDF), nylon or urethane. Fuel cell 102 also includes an outermost layer 108 that defines an outer surface of fuel cell 102. In some embodiments, outermost layer 108 is a moderate fuel barrier to prevent fuel on the outside of fuel cell 102 from penetrating the walls of fuel cell 102. Outermost layer 108 may be made from various materials that are suitable for forming an outer surface of fuel cell 102. In some embodiments, outermost layer 108 may be formed from one or more materials that are resistant to being pierced. For example, outermost layer 108 may be formed from metallic or metallic alloy materials that are resistant to impact from projectiles such as military projectiles. Outermost layer 108 may also be composed of composite or carbon-based materials. Other suitable materials for both innermost layer 104 and outermost layer 108 may also be employed. In some embodiments, innermost and outermost layers 104, 108 as well as other layers of fuel cell 102 may be flexible layers such that fuel cell 102 is a flexible fuel bag or bladder. In other embodiments, innermost and outermost layers 104, 108 may be rigid layers such as metallic layers such that fuel cell 102 forms a rigid fuel tank.

Fuel cell 102 includes containment gel layer 110 interposed between innermost and outermost layers 104, 108. One or more inner intermediate layers 112 are interposed between innermost layer 104 and containment gel 110 and one or more outer intermediate layers 114 are interposed between outermost layer 108 and containment gel 110. Either or both of inner or outer intermediate layers 112, 114 may include one or more textile or fabric layers to provide strength or structure for fuel cell 102. Either or both of inner or outer intermediate layers 112, 114 may additionally or alternatively include other substances or layers such as PVDF, PVDF having carbon black fibers for electrostatic protection, Line-X® material, polyurea elastomer, Dragonshield-HT® material, adhesive, a tie-coat, sealant such as rubber for ballistic protection or other wide ranging or suitable materials. In yet other embodiments, fuel cell 102 may lack either or both intermediate layers 112, 114. In embodiments in which fuel cell 102 does not include intermediate layers 112, 114, containment gel 110 may substantially fill the volume defined between innermost and outermost layers 104, 108.

In the illustrated embodiment, containment gel 110 is interposed between innermost and outermost layers 104, 108 on all sides 102a-102f of fuel cell 102. It will be appreciated, however, that containment gel 110 may be included in less than all of sides 102a-102f of fuel cell 102. Containment gel 110 may be selected from various gels including various elastomeric gels. Containment gel 110 is formulated to self-seal, a ballistically formed hole therein to reduce the leakage of fuel 106 from fuel cell 102 when fuel cell 102 is penetrated. Containment gel 110 does not require water, fuel or aromatics to be activated or triggered to expand to fill the ballistically formed hole, and thus containment gel 110 may be nonreactive with these substances. Containment gel 110 may also be more flexible than conventional rubber, which is particularly beneficial when fuel cell 102 is a flexible fuel bag.

In some embodiments, containment gel 110 is formed or formulated from isocyanate and polyol, which together may produce polyurethane. In some embodiments, the isocyanate may be or include methylene diphenyl diisocyanate such as Hyperlast® LE5006 by Dow® and the polyol may be or include polyether such as Hyperlast® LU1022 by Dow®. Referring to FIG. 3 in conjunction with FIGS. 2A-2C, chart 116 provides various formulations of containment gel 110 having varying levels of isocyanate, polyol and one or more additives. In some embodiments, containment gel 110 may include isocyanate in a range between about 15 percent and about 25 percent such as between 18 percent and 20 percent by weight of a total containment gel formulation weight. As shown in chart 116, the isocyanate component of containment gel 110 is relatively constant compared to the other components of containment gel 110. The amount of polyol in containment gel 110 affects the rigidity of containment gel 110 in that less polyol will cause containment gel 110 to be less rigid or stiff since less bonding or crosslinking occurs between the isocyanate and polyol. As described herein, additives in containment gel 110 may be used to soften containment gel 110. In other embodiments, the weight of the mixture of isocyanate and polyol is in a range between about 20 percent and about 50 percent of the weight of containment gel 110.

In some embodiments, containment gel 110 includes a plasticizer, which affects the rheology of containment gel 110. The rheology of containment gel 110 may be adjusted by altering the amount of plasticizer in the containment gel formulation. Generally the higher the amount of plasticizer added to the containment gel mix, the more containment gel 110 will flow. Thus, the liquidity of containment gel 110 is proportional to the amount of plasticizer in containment gel 110. A containment gel mix that contains less or no plasticizer is stiffer and has more viscosity. Stiffer formulations of containment gel 110 generally have greater elastomeric and snapback properties, and thus may be beneficial when sealing breaches made by smaller ballistic rounds. Breaches made by larger ballistic rounds may use a containment gel formulation with additional plasticizer that has both suitable snapback properties while also having sufficient flow to plug the hole. Accordingly, the type or trajectory of anticipated projectiles may be a factor in determining the amount of plasticizer used in containment gel 110. The rheology of containment gel 110 may be optimized to meet the needs of a particular application. In some applications, plasticizer may be used in containment gel 110 so that containment gel 110 exhibits solid and liquid characteristics at the same time. For example, containment gel 110 may respond more like a solid to sudden impact forces and more like a fluid to gradual forces and static forces. Some ballistic barriers of the illustrative embodiments may perform better with a more solid containment gel while other applications perform better with a more liquid containment gel. For example, bottom side 102b of fuel cell 102 may be better suited to a more solid containment gel whereas vertical sides 102c, 102d, 102e, 102f of fuel cell 102 may be suited for a more liquid containment gel. In addition, more rigid containment gels may be preferred for use in fuel cells that are under pressure so that the containment gel does not exit holes formed ballistically therein. Conversely, fuel cells that are not pressurized may use softer and less rigid containment gels.

In some embodiments, the plasticizer is a monomer added as a third element to the containment gel mixture so that all sites of the isocyanate are reacted while still providing flexibility and less rigidity. In certain examples, the polyol component of the containment gel mixture may include both polymers and monomers, of which the monomers are the plasticizer used to break up the strength of the polymer(s). As shown in chart 116 in FIG. 3, the plasticizer may replace portions of the polyol component of the containment gel formulation depending on the desired rigidity or liquidity of containment gel 110. In the formulations of chart 116, the plasticizer may be a polyglycol such as Hyperlast® LG9005 by Dow which is a polyol but has shorter polymer chains. As the amount of plasticizer increases, the amount of polyether decreases and containment gel 110 becomes less rigid. In some embodiments, the plasticizer may be in a range between 20 percent and 50 percent by weight of a total containment gel formulation weight. By way of example, when using a plasticizer such as LG9005 at a 20 percent level, the resulting containment gel 110 is very stiff and may be beneficial for sealing holes from small arms fire. When using LG9005 at a 60 percent level, containment gel 110 may be a more liquid product, which may be beneficial when sealing holes from larger rounds. By way of further example, a soft or gooey formulation of containment gel 110 may include two parts of plasticizer to one part of polyol, which together are then mixed in a 1:1 ratio with isocyanate. In yet another example, a rigid formulation of containment gel 110 may be obtained by using 80 percent polyol with 20 percent plasticizer, which together are then mixed in a 1:1 ratio with isocyanate. It will be appreciated that the rheology of containment gel 110 may also be adjusted without the use of plasticizer by instead adjusting the ratio or index of the isocyanate and polyol in the containment gel formulation such as by differing the ratio of isocyanate and polyol from a nominal 1:1 mix ratio.

In some embodiments, containment gel 110 may include a catalyst to accelerate the crosslinking, or reaction, time of the isocyanate and polyol. Accelerating the reaction time between the isocyanate and polyol may be beneficial for several reasons. For example, a catalyst may be used to reduce the manufacturing time of containment gel 110. A catalyst may also be used to improve the manufacturing process. For example, when pouring or applying containment gel 110 into over-molded forms, faster cure times made possible by the catalyst may limit the potential for leakage or seepage into nontargeted areas. In other examples, the process for injecting containment gel 110 into a mold such as a double hull tank may require little or no catalyst because cure time is less critical. Using less catalyst to achieve an extended crosslinking time may also be beneficial when the penetration of containment gel 110 into precursor layers such as textile layers is desired, which may yield ballistic performance benefits. Conversely, more catalyst in the containment gel mixture may be beneficial when spraying containment gel 110 on a substrate, allowing containment gel 110 to crosslink (i.e., gel) faster so that containment gel 110 stays on the substrate after being sprayed thereon. In some embodiments, a catalyst may be used in a range between 20 and 60 ppm. In yet other embodiments, the polyol component of the pre-cure containment gel polymer mixture may include the catalyst in a range between 0.1 percent and 0.4 percent by weight. The catalyst may include at least one of an organotin catalyst or an amine catalyst. In one non-limiting example, the organotin catalyst used in containment gel 110 is LU1022 by Dow® (Bis(neodecanoyloxy)dioctylstannane), which may be added to the polyol component of containment gel 110 in a range between 0.02 percent and 0.4 percent by weight. In another non-limiting example, the amine catalyst used in containment gel 110 is a tertiary amine complex such as Dabco® T-120 (1,4-diazabicyclo[2.2.2]octane) by Evonik®, which may be added to the polyol component of containment gel 110 in a range between 0.1 percent and 0.3 percent by weight.

In some embodiments, containment gel 110 may include a tackifier to increase the adhesive and cohesive properties of containment gel 110, thereby facilitating adhesive reconnection between the edges of the ballistically formed holes therein. The tackifier may be added to the formulation matrix for containment gel 110 in varying amounts to adjust the adhesive and cohesive properties of the containment gel polymer mix. The level of tackiness of containment gel 110 affects the ability of containment gel 110 to self-heal. When an object penetrates containment gel 110, containment gel 110 adheres to the object and stretches in the direction of the applied force until the polymer-to-object bonds are broken. Because of the polymer's elastic recovery, after the foreign object is no longer moving through containment gel 110, the disrupted polymers move toward their original polymer configuration determined upon initial crosslinking (i.e., crosslinks formed during curing). The level of tackiness of the containment gel polymer mix along with its level of elastic recovery determines the ability of containment gel 110 to self-heal. In some embodiments, the pre-cure containment gel polymer mixture may include tackifier in a range between 0.1 percent and 5 percent by weight. Tackifiers having low molecular weights such as hydrocarbon resins, terpenes and/or gum rosins may be added to the containment gel polymer mixture prior to curing. In some embodiments, the tackifiers used in containment gel 110 may have the property of being liquid at room temperature. Non-limiting examples of tackifiers include Piccolastic™ A5 hydrocarbon resin and/or Regalrez™ 1018 hydrocarbon resin, both from Eastman®. Containment gel 110 may also include one or more antimicrobial agents and/or one or more antifouling agents.

Containment gel 110 may be formed or manufactured by various methods. In some embodiments, containment gel 110 may be formed by combining isocyanate and polyol in combination with performance specific ingredients such as plasticizers, catalysts, tackifiers, antimicrobial agents, antifouling agents as well as others. The performance specific ingredients may be processed through a proportional mixer and later passed through a static mixer. A static mixer includes motionless mixing elements that divide the flow of a two-part reactive mixture into smaller streams that are then brought back together to combine components into a blended mixture. In one non-limiting example, polyol and plasticizer may be premixed in a 1:1 ratio, after which a proportional or static mixer is used to precisely meter one part isocyanate and one part polyol/plasticizer premix. Catalysts, tackifiers, antimicrobial agents and/or antifouling agents may also be added at the premix stage. Once mixed, containment gel 110 may then be applied to a surface for which ballistic protection is desired such as fuel cell 102. Containment gel layer 110 may be formed by injecting containment gel 110 into a mold. In other application examples, containment gel 110 may be applied to a surface via various suitable coating techniques such as brushing or spraying. Once applied, containment gel 110 may be covered with an outer layer such as outermost layer 108, which protects containment gel 110 from outside elements including abrasion, tearing, ultraviolet rays as well as others.

Figure 4A:
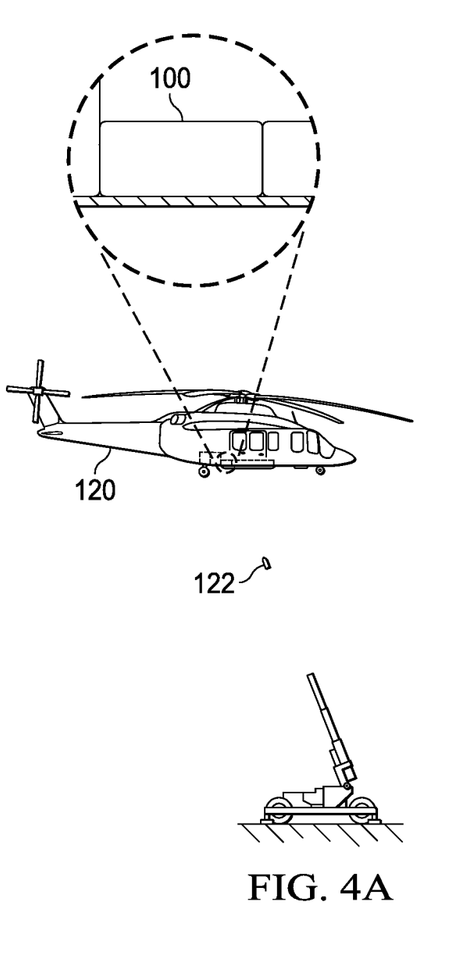
FIGS. 4A-4C are schematic illustrations of a rotorcraft utilizing a containment gel in a sequential flight operating scenario in accordance with embodiments of the present disclosure.
Figure 4B:
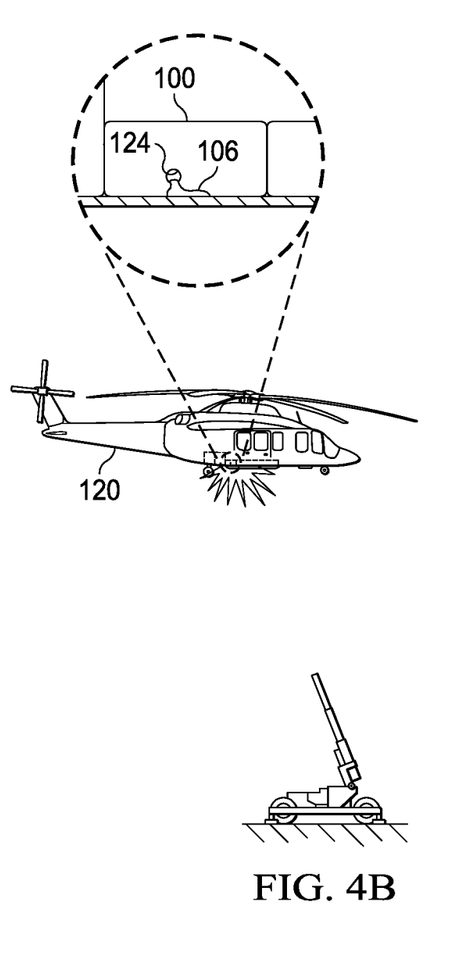
Figure 4C:
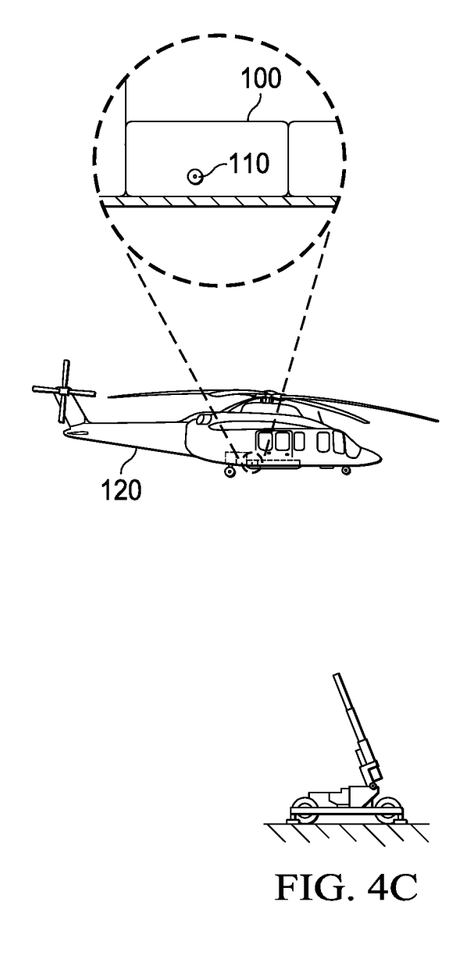

Referring to FIGS. 4A-4C in conjunction with FIGS. 2A-2C in the drawings, an operating scenario for helicopter 120, which utilizes containment gel 110, is schematically illustrated. In FIG. 4A, a projectile 122 has been fired at helicopter 120. Even when innermost and outermost layers 104, 108 are formed from materials that are resistant to being pierced, foreign objects such as projectile 122 may pierce through outermost layer 108 and subsequently through innermost layer 104, leaving a hole 124 that allows fuel 106 to leak out of fuel cells 100 as shown in FIG. 4B. As shown in FIG. 4C, containment gel 110 is configured to quickly seal hole 124. Depending on the caliber or size of projectile 122 and the wall thickness of containment gel 110, self-sealing may be immediate in some cases. In some embodiments, containment gel 110 is configured or formulated so that hole 124 self-seals within 120 seconds with rounds as large as 20 millimeters.

To demonstrate the ballistic, self-healing properties of containment gel 110, samples of containment gel 110 including isocyanate and polyol have been tested. Testing was performed by applying containment gel 110 to a panel of a fuel cell and then firing a military grade round at the panel of the fuel cell to pierce the panel. Details of this test protocol are outlined in MIL-DTL-27422F. In some examples of containment gels that were made and tested, the amount of plasticizer ranged between 20 percent and 50 percent by weight of the total containment gel formulation weight. The testing showed that within this range, the consistency of the resulting containment gel ranged from the consistency of warm honey to hard gelatin. When the military grade round pierced the fuel cell to form a hole, each of the containment gels in this range successfully filled the hole.

Figure 5A:
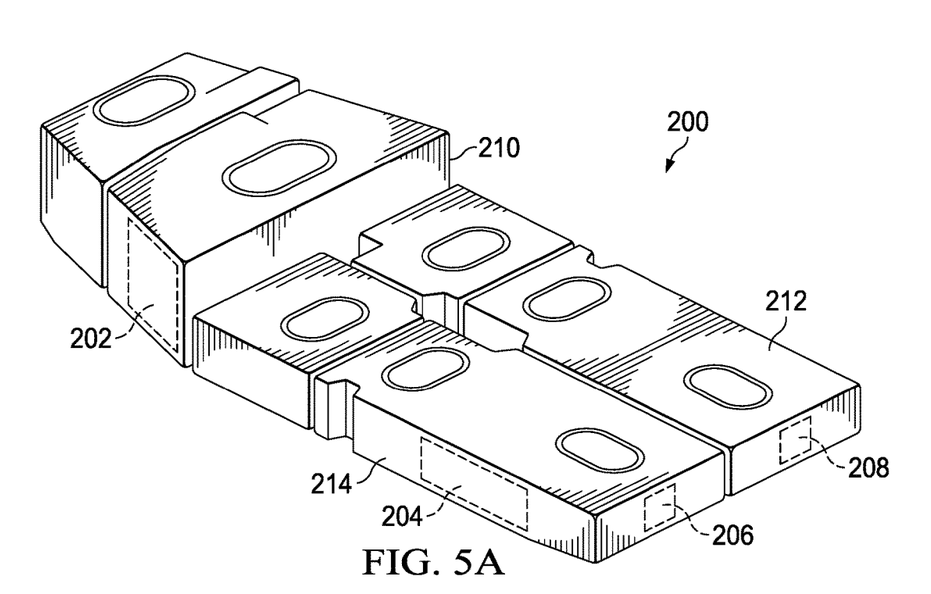
FIGS. 5A-5C are various views of fuel cells including a containment gel for use in an aircraft in accordance with embodiments of the present disclosure.
Figure 5B:
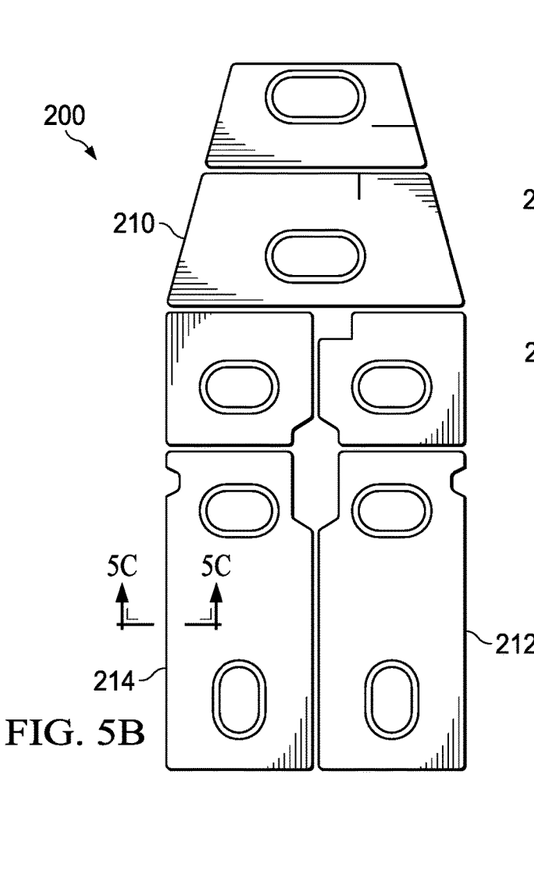
Figure 5C:
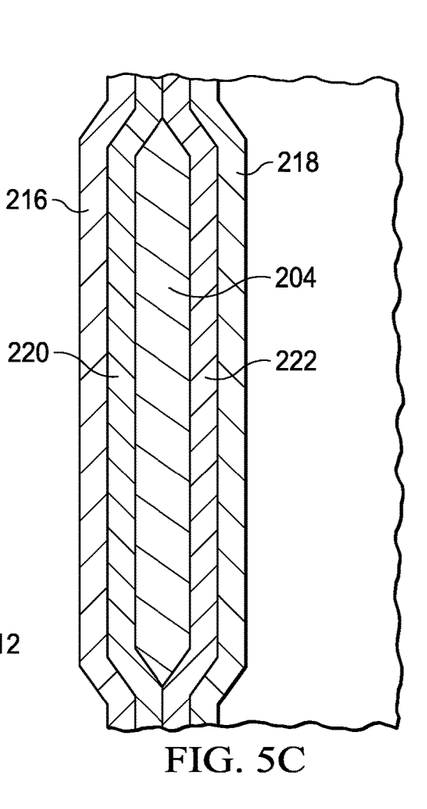

Referring to FIGS. 5A-5C in the drawings, fuel cells for a rotorcraft such as rotorcraft 10 in FIGS. 1A-1B are schematically illustrated and generally designated 200. Containment gel patches 202, 204, 206, 208 are selectively included in only a portion of the side walls of fuel cells 200. More particularly, containment gel patch 202 is included on the starboard side of fuel cell 210, containment gel patch 208 is included on the forward side of fuel cell 212 and containment gel patches 204, 206 are included on the starboard and forward sides of fuel cell 214, respectively. Other containment gel patches may also be included on fuel cells 200 such as containment gel patches on the port or bottom sides of fuel cells 200. Whether all or a portion of the sides of each fuel cell 200 includes containment gel may depend on military specifications. For example, military specifications may require that fuel cells 200 have a high protection level, in which case all sides of each fuel cell 200 may include containment gel as illustrated for fuel cell 102 in FIGS. 2A-2C. In the illustrated embodiment, only a portion of selected fuel cell sides include containment gel, resulting in a lower level of protection, which may be sufficient for certain low protection military specifications.

FIG. 5C illustrates containment gel patch 204 on the starboard side of fuel cell 214, which is representative of the other containment gel patches included in fuel cells 200. Containment gel patch 204 is positioned in a portion of the volume between outermost layer 216 and innermost layer 218. While containment gel patch 204 does not extend from the top to the bottom sides of fuel cell 214, in other embodiments containment gel patch 204 may extend the entire length between the top and bottom sides of fuel cell 214. In some embodiments, one or more intermediate layers 220, 222 may be included on either or both sides of containment gel patch 204. Although in many cases the materials and properties of outermost layer 216 of fuel cells 200 are regulated and/or subject to rigorous specifications, in certain embodiments containment gel patches may be coupled to the exterior side of outermost layer 216 on any of fuel cells 200. Such exterior containment gel patches may be coupled to outermost layer 216 in any manner such as by using adhesive. In yet other embodiments, containment gel patches 202, 204, 206, 208 as well as any exterior containment gel patches may include an outer film or pouch in which the containment gel is held.

Figure 6:
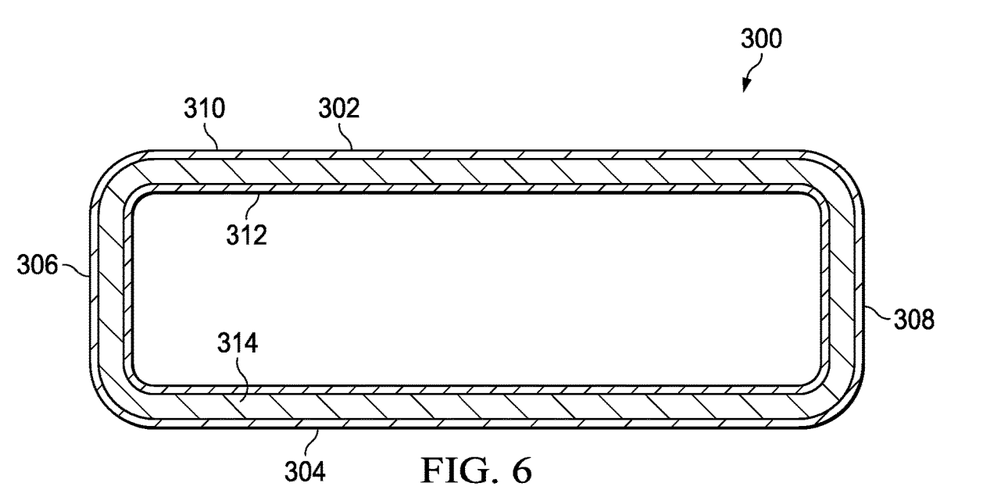
FIG. 6 is a cross-sectional view of a fuel cell including a containment gel in accordance with embodiments of the present disclosure.

Referring to FIG. 6 in the drawings, a fuel cell utilizing containment gel is schematically illustrated and generally designated 300. Fuel cell 300 may be a fuel cell for an aircraft, a ground vehicle or any other machine or device requiring fuel. Fuel cell 300 has a top side 302, a bottom side 304 and peripheral sides 306, 308. All sides of fuel cell 300 include outermost layer 310 and innermost layer 312. Containment gel 314 is interposed between outermost and innermost layers 310, 312 on all sides 302, 304, 306, 308 of fuel cell 300. Fuel cell 300 does not include any intermediate layers such that containment gel 314 fills the entire volume defined between outermost and innermost layers 310, 312. In other embodiments, containment gel 314 may be included in only a portion of the sides 302, 304, 306, 308 of fuel cell 300, and a different substance or no substance at all may be between outermost and innermost layers 310, 312 where containment gel 314 is absent.

Figure 7A:
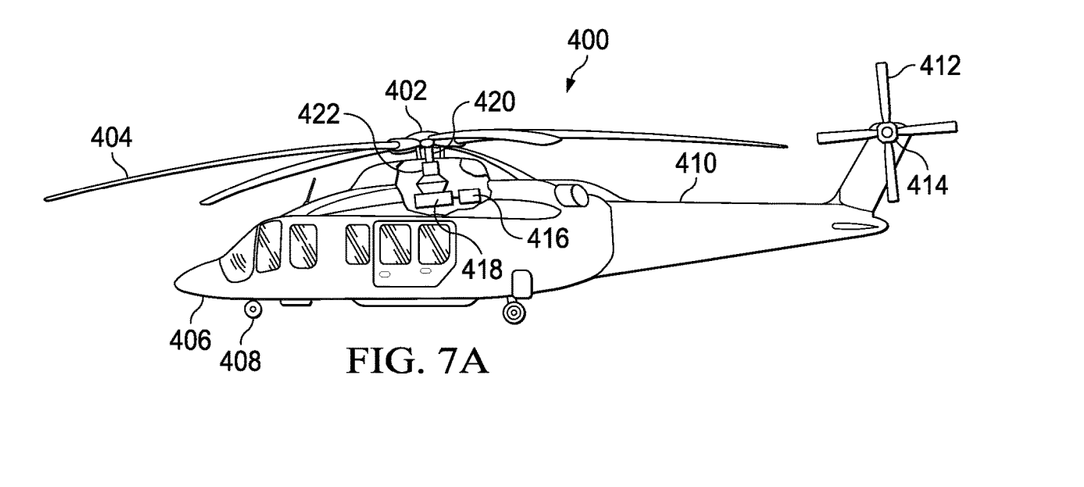
FIGS. 7A-7C are schematic illustrations of a rotorcraft utilizing a containment gel in accordance with embodiments of the present disclosure.
Figure 7B:
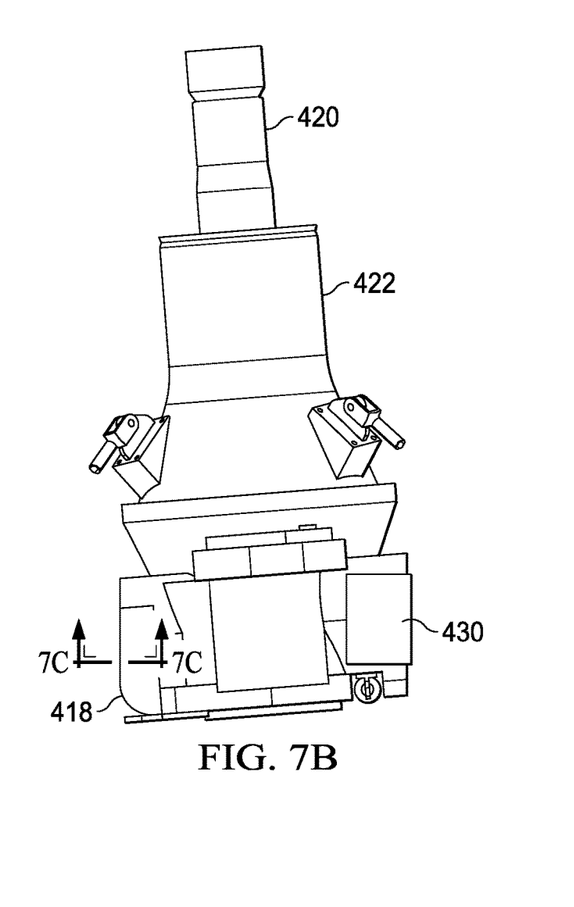
Figure 7C:
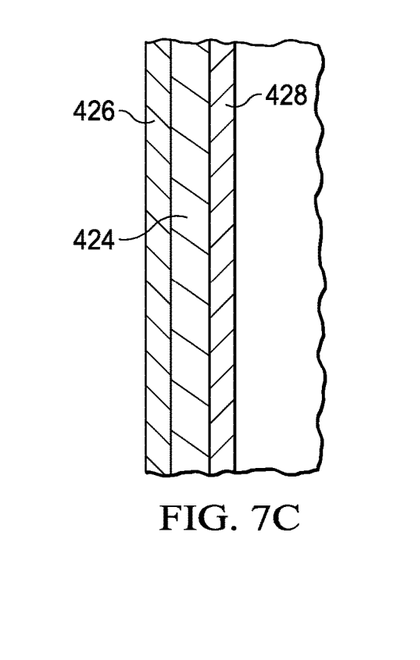

Referring to FIGS. 7A-7C the drawings, a rotorcraft utilizing containment gel is schematically illustrated and generally designated 400. Rotorcraft 400 is depicted as a helicopter having a rotor hub assembly 402, which includes a plurality of rotor blade assemblies 404. Rotor hub assembly 402 is rotatable relative to a fuselage 406 of rotorcraft 400. The pitch of rotor blade assemblies 404 can be collectively and/or cyclically manipulated to selectively control direction, thrust and lift of rotorcraft 400. A landing gear system 408 provides ground support for rotorcraft 400. A tailboom 410 extends from fuselage 406. A tail rotor 412 includes a tail rotor hub assembly 414 that is rotatably coupled to the aft portion of tailboom 410. Rotor hub assembly 402 is powered by an engine 416 via a main rotor gearbox 418. Mast 420 extends through a top case 422.

Main rotor gearbox 418 contains gears and lubricant. In the event that a hole is formed in main rotor gearbox 418, lubricant may leak from main rotor gearbox 418, subjecting the gears therein to damage. FIG. 7C shows a cross-sectional view of a wall of main rotor gearbox 418 including a containment gel layer 424. Containment gel 424 is surrounded by outer and inner walls 426, 428, although in other embodiments main rotor gearbox 418 may include only a single wall. Instead of, or in addition to, containment gel 424 on the inside of outer wall 426, main rotor gearbox 418 may also be protected from ballistic projectiles using one or more containment gel patches 430. Containment gel patches 430 may be adhered on any portion of main rotor gearbox 418 that is susceptible to damage by incoming projectiles. Alternatively, containment gel may cover or be included on all sides of main rotor gearbox 418. The inclusion of containment gel 424 and containment gel patches 430 on main rotor gearbox 418 is a non-limiting example of the wide variety of applications for which the containment gel of the illustrative embodiments may be used.

Figure 8A:
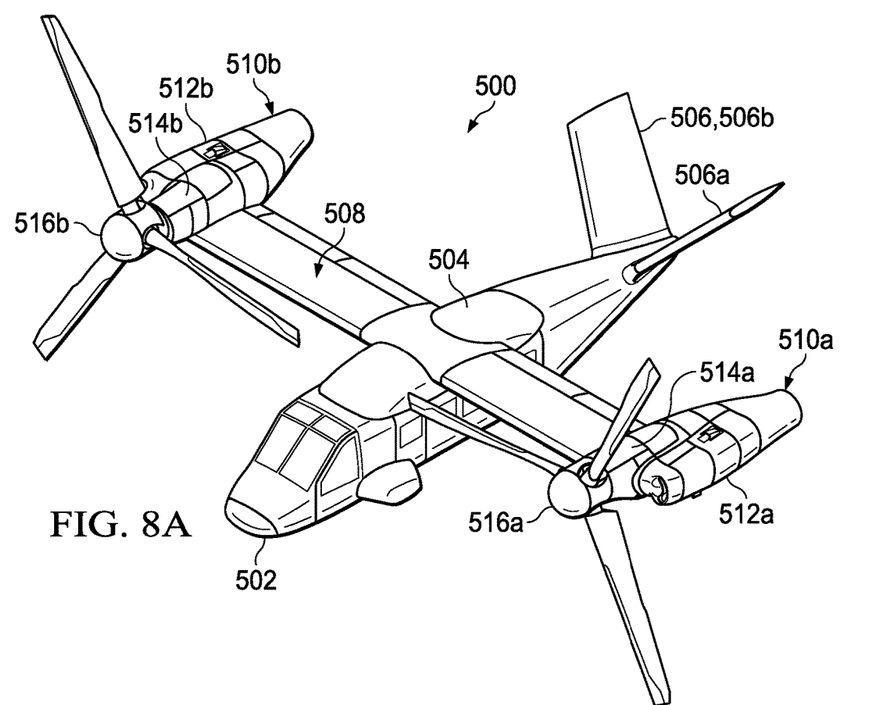
FIGS. 8A-8F are schematic illustrations of a tiltrotor aircraft utilizing a containment gel in accordance with embodiments of the present disclosure.
Figure 8B:
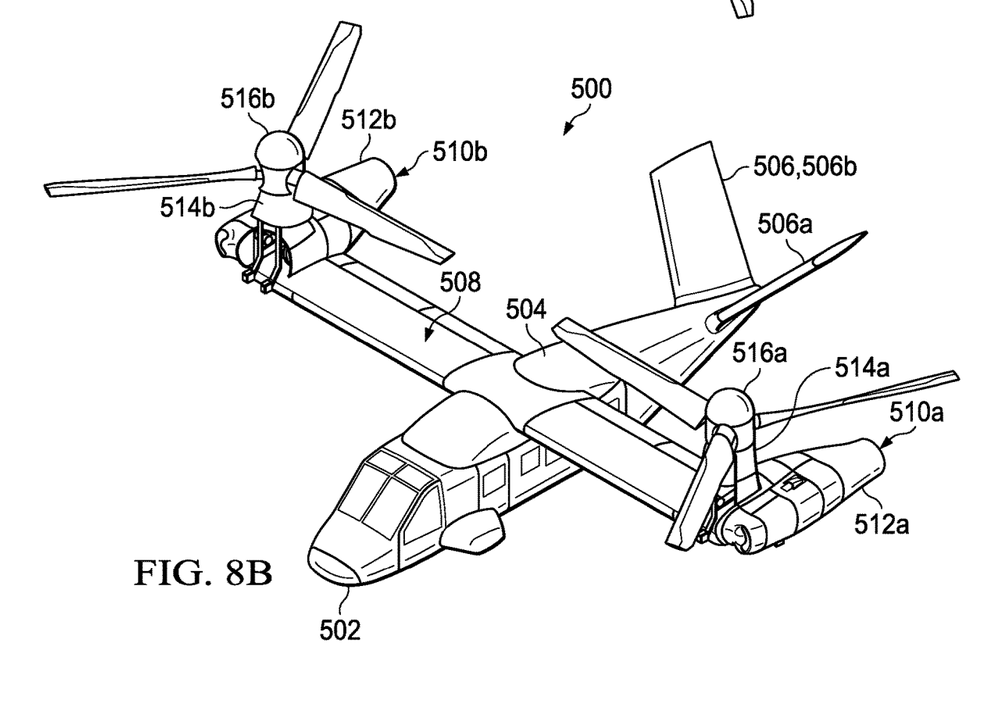
Figure 8C:
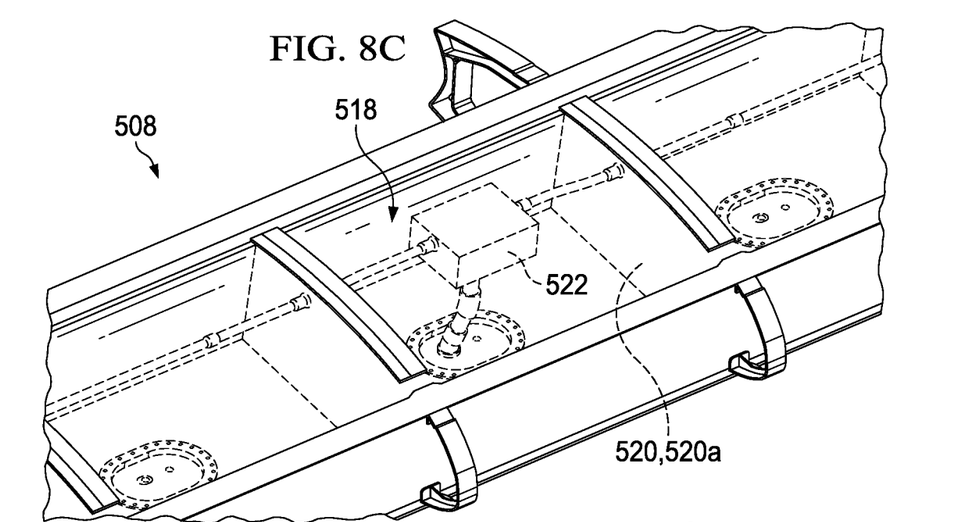
Figure 8D:
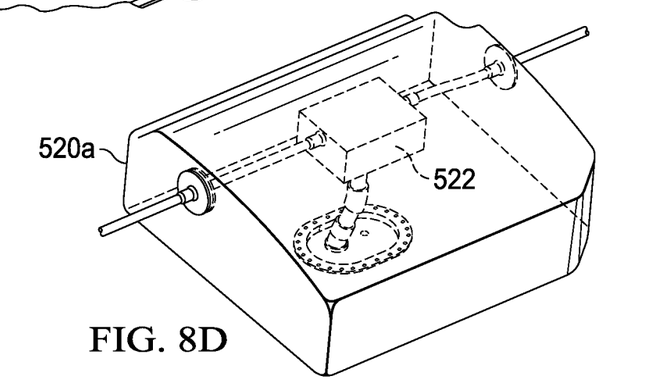
Figure 8E:
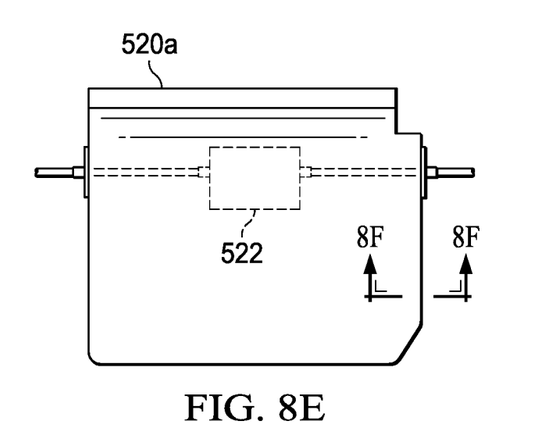

Referring to FIGS. 8A-8F in the drawings, a tiltrotor aircraft utilizing containment gel is schematically illustrated and generally designated 500. Tiltrotor aircraft 500 includes a fuselage 502, a wing mount assembly 504 and a tail assembly 506 including rotatably mounted tail members 506a, 506b having control surfaces operable for horizontal and/or vertical stabilization during forward flight. A wing assembly 508 is supported by wing mount assembly 504. Coupled to outboard ends of wing assembly 508 are propulsion assemblies 510a, 510b. Propulsion assembly 510a includes a nacelle depicted as fixed pylon 512a that houses an engine and a transmission. Thus, the nacelle is fixed relative to wing assembly 508. In addition, propulsion assembly 510a includes a mast assembly 514a having a mast that is rotatable relative to fixed pylon 512a, wing assembly 508 and fuselage 502 between a generally horizontal orientation, as best seen in FIG. 8A, and a generally vertical orientation, as best seen in FIG. 8B. Propulsion assembly 510a also includes a proprotor assembly 516a, including proprotor blade assemblies radiating therefrom, which is rotatable responsive to torque and rotational energy provided via a rotor hub assembly and drive system mechanically coupled to the engine and transmission housed by fixed pylon 512a. Similarly, propulsion assembly 510b includes a nacelle depicted as fixed pylon 512b that houses an engine and transmission and a mast assembly 514b that is rotatable relative to fixed pylon 512b, wing assembly 508 and fuselage 502. Propulsion assembly 510b also includes a proprotor assembly 516b, including proprotor blade assemblies radiating therefrom, which is rotatable responsive to torque and rotational energy provided via a rotor hub assembly and drive system mechanically coupled to the engine and transmission housed by fixed pylon 512b.

FIG. 8A illustrates tiltrotor aircraft 500 in airplane or forward flight mode, in which proprotor assemblies 516a, 516b are rotating in a substantially vertical plane to provide a forward thrust enabling wing assembly 508 to provide a lifting force responsive to forward airspeed, such that tiltrotor aircraft 500 flies much like a conventional propeller driven aircraft. FIG. 8B illustrates tiltrotor aircraft 500 in helicopter or vertical takeoff and landing (VTOL) flight mode, in which proprotor assemblies 516a, 516b are rotating in a substantially horizontal plane to provide a lifting thrust, such that tiltrotor aircraft 500 flies much like a conventional helicopter. It should be appreciated that tiltrotor aircraft 500 can be operated such that proprotor assemblies 516a, 516b are selectively positioned between forward flight mode and VTOL flight mode, which can be referred to as a conversion flight mode. Even though tiltrotor aircraft 500 has been described as having one engine in each fixed pylon 512a, 512b, it should be understood by those having ordinary skill in the art that other engine arrangements are possible and are considered to be within the scope of the present disclosure including, for example, having a single engine which may be housed within fuselage 502 that provides torque and rotational energy to both proprotor assemblies 516a, 516b.

Tiltrotor aircraft 500 has a fuel system 518 that includes one or more fuel cells 520 disposed inside wing assembly 508. Fuel cells 520 may be bags or bladders that are flexible, semi-rigid or rigid. For example, fuel cells 520 may be fuel bags formed from Kevlar® or rubber, among other materials. In other embodiments, fuel cells 520 may be tanks formed from a rigid material such as metal, polymer, plastic or any other rigid material. Fuel system 518 may also include one or more fuel pumps 522 to transfer fuel from fuel cells 520.

Figure 8F:
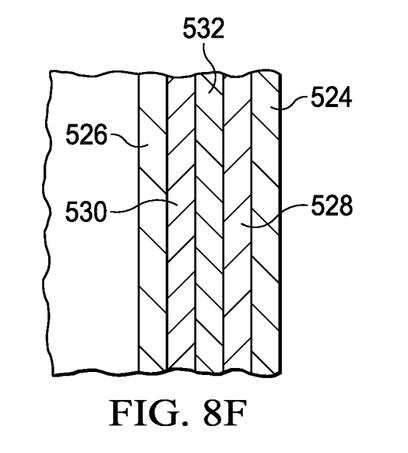

FIG. 8F shows a cross-sectional view of a peripheral side of fuel cell 520*a* of fuel cells 520. The peripheral side of fuel cell 520*a* includes outermost layer 524, innermost layer 526, one or more outer intermediate layers 528, one or more inner intermediate layers 530 and containment gel 532 interposed between outer and inner intermediate layers 528, 530. In some embodiments, the peripheral side of fuel cell 520*a* may lack intermediate layers 528, 530. The inclusion of containment gel 532 on fuel system 518 of tiltrotor aircraft 500 is illustrative of the wide variety of fuel systems with which the containment gel of the illustrative embodiments may be used, including fuel systems located anywhere on an aircraft such as fuselage 502, wing assembly 508 or elsewhere. The containment gel of the illustrative embodiments may also be used on external fuel systems.

Figure 9A:
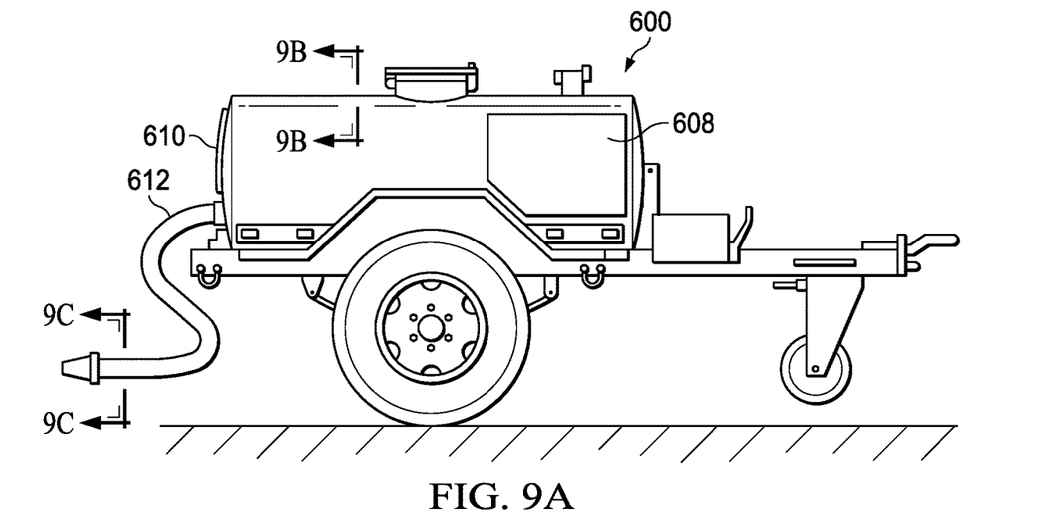
FIGS. 9A-9C are various views of a water tank and water hose utilizing a containment gel in accordance with embodiments of the present disclosure.
Figure 9B:
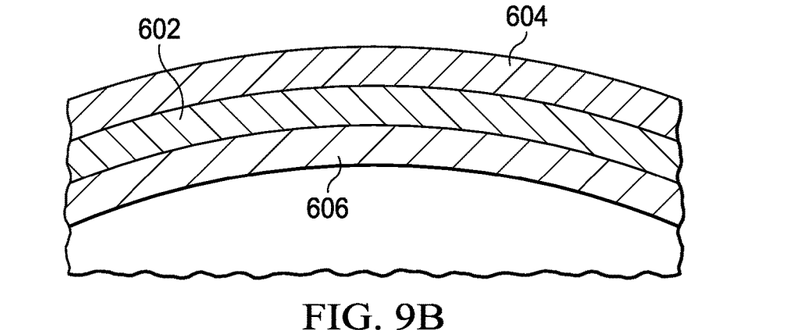
Figure 9C:
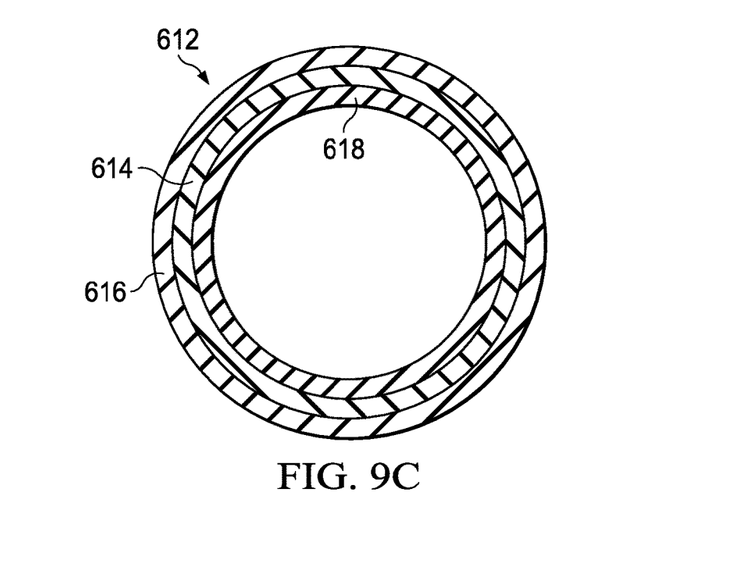

Referring to FIGS. 9A-9C in the drawings, a transportable water tank utilizing containment gel is schematically illustrated and generally designated 600. Water may be a valuable resource in certain operational scenarios such as at a forward operating base. Cost estimates of water at such locations may be as high as $100 per gallon. Should a projectile impact water tank 600, water may leak from water tank 600, thus wasting a valuable resource. Because the containment gel of the illustrative embodiments does not rely on contact with fuel or other aromatics to be activated or triggered, the containment gel may be used in non-fuel applications such as water tank 600. As shown in FIG. 9B, the wall of water tank 600 includes containment gel 602 between outer and inner layers 604, 606. In other embodiments, water tank 600 may lack inner layer 606 and containment gel 602 may be adhered to the inside of outer layer 604. Water tank 600 also includes containment gel patches 608, 610 coupled to the side and rear of water tank 600, respectively. The containment gel of the illustrative embodiments may also be used in hose or transport applications. FIG. 9C shows a cross-sectional view of hose 612 used to extract water from water tank 600. Hose 612 includes containment gel layer 614 interposed between outermost layer 616 and inner liner 618. Containment gel layer 614 prevents water from leaking from hose 612 in the event that hose 612 is pierced by an object or projectile. Thus, the containment gel of the illustrative embodiments may be used in both storage and transport applications for any liquid. While water tank 600 is illustrated as being movable, the containment gel may also be used in walls of enclosures that are fixed objects on the ground such as a water tower. In other embodiments, the containment gel may be used in a wall of a flat panel that is not part of an enclosure.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A fuel cell containing fuel for an aircraft, the fuel cell consisting of:
an innermost layer configured to contact the fuel;
a textile inner intermediate layer;
a textile outer intermediate layer;
an outermost layer; and
a containment gel having a plurality of states including an unpenetrated state and a penetrated state, the containment gel in the unpenetrated state formed from unseparated isocyanate and polyol interposed between the innermost and outermost layers, the containment gel configured to expand in the penetrated state to self-seal a ballistically formed hole therein, thereby reducing leakage of the fuel from the fuel cell;
wherein, the containment gel is nonreactive with the fuel in the penetrated state.

2. The fuel cell as recited in claim 1 wherein the isocyanate is in a range greater than or equal to 18 percent and less than or equal to 20 percent by weight of a total containment gel formulation weight.

3. The fuel cell as recited in claim 1 wherein the isocyanate further comprises methylene diphenyl diisocyanate.

4. The fuel cell as recited in claim 1 wherein the containment gel further comprises a plasticizer to affect the rheology of the containment gel.

5. The fuel cell as recited in claim 4 wherein a liquidity of the containment gel is proportional to an amount of the plasticizer in the containment gel.

6. The fuel cell as recited in claim 4 wherein the containment gel includes the plasticizer in a range greater than or equal to 20 percent and less than or equal to 50 percent by weight of a total containment gel formulation weight.

7. The fuel cell as recited in claim 4 wherein the plasticizer further comprises polyglycol.

8. The fuel cell as recited in claim 1 wherein the containment gel further comprises a catalyst to accelerate cross-linking of the isocyanate and the polyol.

9. The fuel cell as recited in claim 8 wherein the catalyst comprises at least one of an organotin catalyst or an amine catalyst.

10. The fuel cell as recited in claim 8 wherein the polyol component of a pre-cure containment gel polymer mixture includes the catalyst in a range greater than or equal to 0.1 percent and less than or equal to 0.4 percent by weight.

11. The fuel cell as recited in claim 1 wherein the containment gel further comprises a tackifier to increase adhesive and cohesive properties of the containment gel, thereby facilitating adhesive reconnection between the edges of the hole.

12. The fuel cell as recited in claim 11 wherein a pre-cure containment gel polymer mixture includes the tackifier in a range greater than or equal to 0.1 percent and less than or equal to 5 percent by weight.

13. The fuel cell as recited in claim 11 wherein the tackifier comprises a hydrocarbon resin.

14. The fuel cell as recited in claim 1 wherein the containment gel further comprises at least one of an antimicrobial agent or an antifouling agent.

15. The fuel cell as recited in claim 1 wherein the textile inner intermediate layer is disposed between the innermost layer and the containment gel; and
wherein the textile outer intermediate layer is disposed between the outermost layer and the containment gel, the textile outer intermediate layer separated from the textile inner intermediate layer by the containment gel.

16. The fuel cell as recited in claim 1 wherein the fuel cell consists of the following layers in order from the innermost layer to the outermost layer: (1) the innermost layer, (2) the textile inner intermediate layer, (3) the containment gel, (4) textile outer intermediate layer and (5) the outermost layer; wherein, the outermost layer is a nonpolyurethane outermost layer.

17. The fuel cell as recited in claim 1 wherein each and all of the layers of the fuel cell exclude rubber.

18. An aircraft comprising:
a fuselage;
a propulsion system powered by fuel; and
one or more fuel cells configured to store the fuel, each fuel cell consisting of:
an innermost layer configured to contact the fuel;
a textile inner intermediate layer;
a textile outer intermediate layer;
an outermost layer; and
a containment gel having a plurality of states including an unpenetrated state and a penetrated state, the containment gel in the unpenetrated state formed from unseparated isocyanate and polyol interposed between the innermost and outermost layers, the containment gel configured to expand in the penetrated state to self-seal a ballistically formed hole therein, thereby reducing leakage of the fuel from the fuel cell;
wherein, the containment gel is nonreactive with the fuel in the penetrated state.

19. The aircraft as recited in claim 18 wherein the propulsion system comprises a gearbox containing gears and a lubricant, the gearbox including a containment gel layer formed from isocyanate and polyol.

20. The aircraft as recited in claim 18 wherein the innermost and outermost layers are flexible layers such that each fuel cell is a flexible fuel bag.

* * * * *